Aug. 24, 1926.

N. S. NELSON 1,597,614

BATTERY INDICATOR

Filed May 10, 1924    2 Sheets-Sheet 1

Nels S. Nelson
INVENTOR

BY Victor J. Evans
ATTORNEY

WITNESS:

Aug. 24, 1926.
N. S. NELSON
BATTERY INDICATOR
Filed May 10, 1924    2 Sheets-Sheet 2
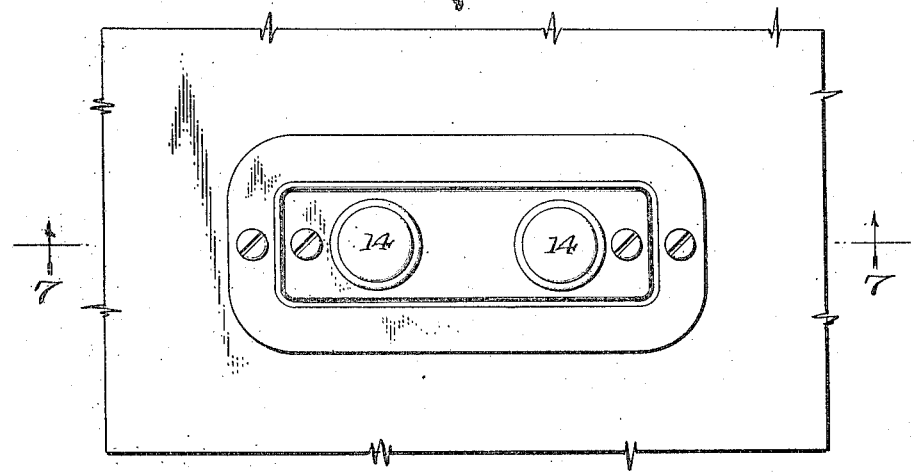
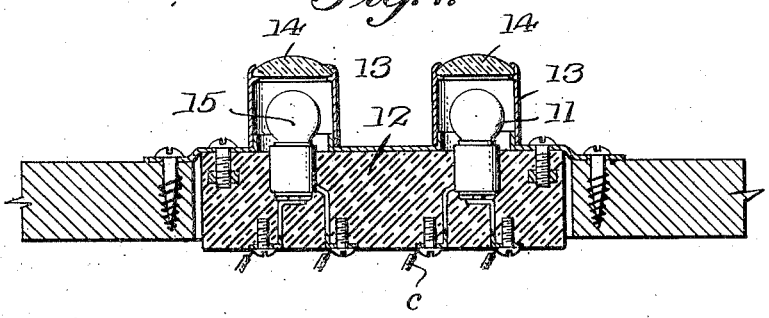
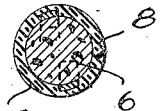
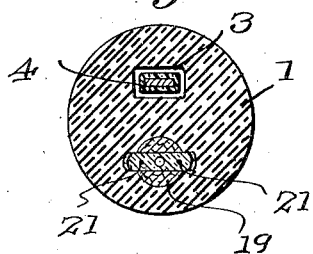
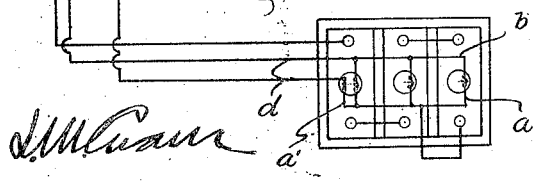

Patented Aug. 24, 1926.

1,597,614

UNITED STATES PATENT OFFICE.

NELS S. NELSON, OF PONTIAC, MICHIGAN.

BATTERY INDICATOR.

Application filed May 10, 1924. Serial No. 712,399.

This invention relates to means for indicating the condition of a storage battery, the general object of the invention being to provide means arranged so that they can be seen by the occupant of a motor vehicle to indicate that the water level in the battery is low and that the battery is heating through overcharging.

Another object of the invention is to provide a float actuated by the water level in the battery and arranged to close a circuit in the indicator lamp when the water level is low and a thermostat which will close a circuit of a second lamp when the battery becomes hot through overcharging.

A further object of the invention is to arrange the float and thermostat in a plug which is adapted to be substituted for the plug used to close the filling opening of each cell of the battery.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 4 is a section on line 4—4 of Figure 3.

Figure 5 is a section on line 5—5 of Figure 3.

Figure 6 is a view of the indicating means arranged on the dash or instrument board of the vehicle.

Figure 7 is a section on line 7—7 of Figure 6.

Figure 8 is a diagrammatic view of the circuits.

Figure 1:
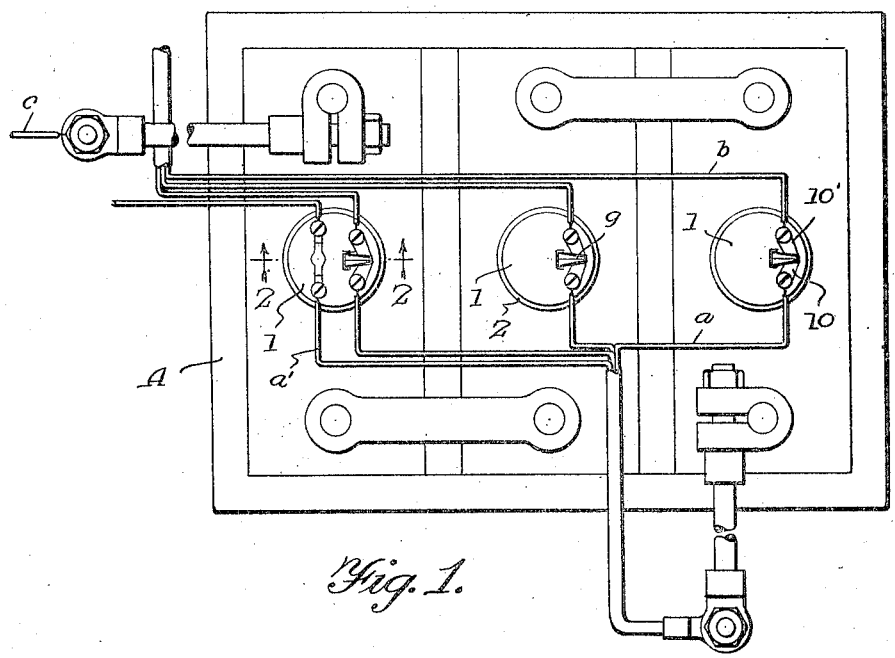
Figure 1 is a plan view of the battery showing my invention applied thereto.
Figure 2:
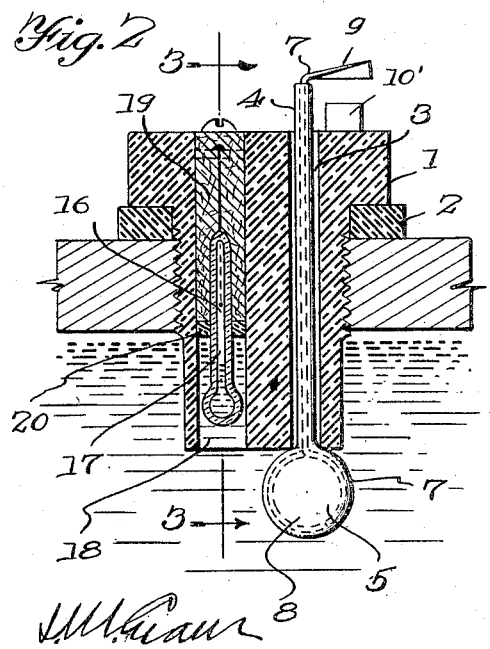
Figure 2 is a section on line 2—2 of Figure 1.
Figure 3:
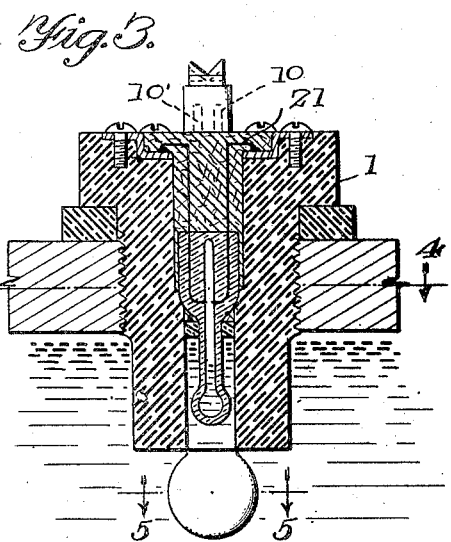
Figure 3 is a section on line 3—3 of Figure 2.

As is well known, most batteries are injured by failure to keep the battery full of water and overheating through overcharging. As an inspection of the water level in a battery involves considerable trouble owing to the fact that the battery is usually placed under the floor board or under the seat of the vehicle, such inspection is usually delayed or omitted over a considerable period so that there is likelihood of the battery becoming dry so I have provided means whereby an indicator on the instrument board or other portion of a car will indicate when the battery needs refilling and I also provide means on the instrument board for indicating when the battery is heating. In carrying out my invention I provide a plug 1 which is substituted for the usual filling hole plug of the battery, the drawings showing a battery A provided with three cells therefor having three plugs, each of which is indicated by the numeral 1. These plugs are preferably formed of hard rubber or rubber composition and their heads rest upon a washer 2 for insuring a tight joint. The drawings show the plug as being screw threaded to engage the screw threaded hole in the battery but it will of course be understood that other fastening means can be used. A rectangular hole 3 passes longitudinally through each plug adjacent one side thereof to receive the stem 4 of a float 5. This float is preferably formed of a ball 6 of cork or other buoyant material and the stem of a strip 7 of metal which has its lower end split with the separated parts curved around the ball, as shown at 7'. Then the parts are covered with a coating 8 of rubber or the like which entirely encloses the ball and the strip except the upper end thereof which is bent to provide the contact part 9 which is of V-shape at its extremity. Thus the parts of the float are protected from the injurious action of the liquid of the battery. By making the hole 3 of rectangular shape and the stem of similar shape the float is prevented from turning as it moves vertically. The liquid in the battery will hold the float pressed against the bottom of the plug, as shown in Figure 2 but when the liquid becomes low the float will drop so that the V-shaped contact 9 will bridge the terminals 10 and 10', one of which is connected by the conductor $a$ with one terminal of the battery while the other is connected by the conductor $b$ with a lamp 11 on the instrument board of the car and which is connected by the conductor $c$ with the other terminal of the battery. I prefer to place the lamp 11 on a panel 12 which is formed of insulating material and is suitably fastened to the instrument board or other portion of the car so that it can be readily seen by the driver of the car. The lamp is enclosed by the usual cover 13 which carries the lens 14.

From the foregoing it will be seen that as long as the level of water in the battery is high the float will be kept in raised position so that the contact 9 is well above the terminals and no current will flow to the lamp. As soon as the level of water becomes low, however, the weight will drop until the contact 9 is located slightly above the terminals so that it will touch the terminals due to the splashing of the water in the battery from the movement of the car so that current will flow intermittently to the lamp, thus causing the same to flicker or "wink" and thus notify the operator that his battery needs refilling. If the battery is not refilled the float will drop until the contact 9 remains in engagement with the terminals and thus the lamp will remain lighted. As will be seen each plug is electrically connected with the lamp so that if any one cell becomes dry the lamp will be lighted.

The means for indicating the heating of the battery comprises a lamp 15 on the panel 12 and which is connected with the conductor $c$ and a thermostat 16 which is carried by one of the plugs 1 and to which the lamp is connected by the conductor $d$. This thermostat comprises a mercury tube 17 located in an opening 18 formed in the plug and held in place by a filling 19 of wax or the like, a washer 20 of rubber or the like being placed at the bottom of the filling to insure a water tight joint. A bulb of the tube is arranged in the unfilled portion of the opening so that it is immersed in the liquid and wires 21 are embedded in the filling and have their ends passing through the walls of the tube and spaced apart so that when the mercury rises and reaches these ends current can pass from one wire to the other. One wire is connected with the conductor $b$ and the other is connected with the negative terminal of the battery, as shown at $a'$.

It will thus be seen that when the battery begins to heat through overcharging the mercury in the tube will rise until it bridges the space between the two wires 21 and this will permit current to flow to the lamp 15 so as to indicate to the operator that his battery is being overcharged.

I prefer to make the lamp 13 or its lens 14 of clear glass so as to give a white light and to make the lamp 15 or its lens of glass colored red so as to give a red light.

From the foregoing it will be seen that I have provided simple means whereby an operator of a vehicle can tell at a glance whether or not his battery needs refilling and whether or not it is being overcharged so that he does not have to lift up the floor board or the seat and look into the battery to see its condition.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described including a plug of non-conducting material having spaced longitudinal openings therethrough, a thermostat arranged in one of said openings, a rod in the other opening, an angular contact at the upper end of the rod, a cork ball attached to the other end of the rod, and a coating of non-conducting material for said ball and rod up to the angular contact.

In testimony whereof I affix my signature.

NELS S. NELSON.